(12) United States Patent
Honda

(10) Patent No.: US 10,309,411 B2
(45) Date of Patent: Jun. 4, 2019

(54) ROTATOR

(71) Applicant: AISAN KOGYO KABUSHIKI KAISHA, Obu-shi, Aichi-ken (JP)

(72) Inventor: Yoshihiko Honda, Obu (JP)

(73) Assignee: Arm Limited, Cambridge (GB)

( * ) Notice: Subject to any disclaimer, the term of this patent is extended or adjusted under 35 U.S.C. 154(b) by 907 days.

(21) Appl. No.: 14/194,699

(22) Filed: Mar. 1, 2014

(65) Prior Publication Data

US 2014/0255199 A1 Sep. 11, 2014

(30) Foreign Application Priority Data

Mar. 7, 2013 (JP) .................................. 2013-044946

(51) Int. Cl.
*F04D 29/02* (2006.01)
*F04D 29/18* (2006.01)
*B29C 45/00* (2006.01)

(52) U.S. Cl.
CPC .......... *F04D 29/18* (2013.01); *B29C 45/0025* (2013.01); *B29C 45/0046* (2013.01); *F04D 29/026* (2013.01); *F04D 29/188* (2013.01); *F05D 2230/20* (2013.01); *F05D 2300/43* (2013.01)

(58) Field of Classification Search
CPC ... B29C 45/0046; F04D 29/18; F04D 29/188; F04D 29/20; F04D 29/026; F04D 29/02
See application file for complete search history.

(56) References Cited

U.S. PATENT DOCUMENTS

| 6,443,692 B1* | 9/2002 | Sakamoto | F04D 5/002 |
| | | | 415/200 |
| 6,941,832 B2* | 9/2005 | Noguchi | B29C 45/0046 |
| | | | 264/478 |
| 7,048,494 B2* | 5/2006 | Iijima | F04D 29/188 |
| | | | 415/55.1 |
| 2006/0120853 A1 | 6/2006 | Narisako et al. | |

(Continued)

FOREIGN PATENT DOCUMENTS

| JP | 6363597 | 4/1988 |
| JP | H9-158885 | 6/1997 |

(Continued)

OTHER PUBLICATIONS

Office Action dated Mar. 22, 2016, in Japanese Patent Application No. 2013-044946.

(Continued)

*Primary Examiner* — Richard A Edgar
*Assistant Examiner* — Michael L Sehn
(74) *Attorney, Agent, or Firm* — Vierra Magen Marcus LLP

(57) ABSTRACT

A rotator may be configured to be accommodated in a casing of a pump for sucking a fluid into the casing and discharging the fluid outside of the casing. The rotator may comprise an insert portion configured to insert a rotating shaft and one or more communicating openings. The one or more communicating openings may be disposed in a vicinity of the insert portion, and pierce the rotator in a direction along the rotating shaft. The rotator may be made of resin. A flow direction of the resin located around the insert portion and the one or more communicating openings may extend at least in the direction along the rotating shaft.

10 Claims, 13 Drawing Sheets

(56) References Cited

U.S. PATENT DOCUMENTS

2007/0183886 A1* 8/2007 Koyama ............... F04D 5/002
  415/55.1
2011/0200447 A1* 8/2011 Muller ............... F01D 5/34
  416/230

FOREIGN PATENT DOCUMENTS

| JP | H10-259789 | 9/1998 |
| JP | 2004-50465 | 2/2004 |
| JP | 2006161723 A | 6/2006 |
| JP | 2008-240664 | 10/2008 |

OTHER PUBLICATIONS

Office Action dated Mar. 3, 2015 in Korean Patent Application No. 2013-0161491 filed Dec. 23, 2013, with English translation, 6 pages.
Concise explanation of why Japanese Utility Model Laid Open No. 6363597 published Apr. 26, 1988 was cited, 2 pages.
English Abstract of Japanese Patent Application No. JPH9-158885.
Machine Translation prepared by the Japanese Patent Office of Japanese Patent Application No. JPH9-158885.
English Translation of Abstract of Japanese Patent Application No. JPH10-259789.
Machine Translation prepared by the Japanese Patent Office of Japanese Patent Application No. JPH10-259789.
English Translation of Abstract of Japanese Patent Application No. JP2008-240664.
Machine Translation prepared by the Japanese Patent Office of Japanese Patent Application No. JP2008-240664.

* cited by examiner

ROTATOR

CROSS-REFERENCE TO RELATED APPLICATION

This application claims priority to Japanese Patent Application No. 2013-44946 filed on Mar. 7, 2013, the contents of which are hereby incorporated by reference into the present application.

TECHNICAL FIELD

The present specification discloses a rotator made of resin and configured to be accommodated in a casing of a pump and to suck a fluid into the casing and discharge the fluid outside of the casing.

DESCRIPTION OF RELATED ART

Japanese Patent Application Publication No. H10-259789 discloses an impeller for a pump. The impeller comprises a shaft hole into which a rotating shaft is inserted at a rotation center, and a plurality of communicating openings formed in a circumference of the shaft hole. The impeller is manufactured by resin injection molding. In the injection molding, a gate of a mold has a circular ring shape around the shaft hole. In a cavity of the mold, there are disposed a pin for forming the shaft hole, and a plurality of pins for forming the plurality of communicating openings. The gate is positioned further toward an outer circumference side of the impeller than the plurality of pins for forming the communicating openings.

SUMMARY

According to the above technique, at a molding time, molten resin that flows into the cavity from the gate flows outside from the circular ring-shaped gate and also flows inside from the gate, in the cavity. The pins for forming the communicating openings are disposed in the gate. Therefore, the molten resin is branched due to collision against the pins, and is joined together after passing the pins. As a result, a weld line occurs sometimes at a joined portion of the molten resin. In general, resin used for manufacturing the impeller contains a glass fiber, an inorganic substance, and the like. Consequently, the occurrence of the weld line decreases size precision of the impeller, because a contraction percentage of the resin after the molding becomes different due to a different orientation of the glass fiber and the like contained in the resin at the circumference of the weld line.

The present specification provides a technique of suppressing reduction in size precision of a rotator in a resin mold, the rotator being made of resin used for a pump.

The present application discloses a rotator configured to be accommodated in a casing of a pump for sucking a fluid into the casing and discharging the fluid outside of the casing. The rotator may comprise an insert portion configured to insert a rotating shaft, and one or more communicating openings. The one or more communicating openings may be disposed in a vicinity of the insert portion, and pierce the rotator in a direction along the rotating shaft. The rotator may be made of resin. A flow direction of the resin located around the insert portion and the one or more communicating openings may extend at least in the direction along the rotating shaft.

In performing resin molding for manufacturing this rotator, molten resin is flown in the direction of the rotating shaft along a forming member that is disposed in a mold in order to form communicating openings and an insert portion. According to this configuration, at the resin molding time, branching of the molten resin due to collision against the forming member may be suppressed. As a result, the molten resin may be suppressed from joining, and occurrence of a weld line may be suppressed. According to this configuration, reduction in size precision of the rotator may be suppressed.

The present application also discloses a manufacturing method of the rotator. The manufacturing method may comprise filling molten resin in a rotator forming space of a mold having a gate and the rotator forming space by injecting the molten resin from the gate of the mold, and forming the rotator by cooling the resin in the rotator forming space. The mold may comprise an insert portion forming member in the rotator forming space. The insert portion forming member may be configured to form an insert portion configured to insert a rotating shaft. A communicating opening forming member may be configured to form one or more communicating openings disposed in a vicinity of the insert portion and piercing the rotator in a direction along the rotating shat. The filling of the molten resin may include flowing the molten resin in the rotator forming space along an axis direction of the insert portion forming member and the communicating opening forming member.

According to this configuration, branching of the molten resin due to collision against the communicating opening forming member and the insert portion forming member and joining of the molten resin at a position passing the forming members may be prevented. As a result, occurrence of a weld line may be suppressed, and reduction in size precision of the rotator may be suppressed.

DETAILED DESCRIPTION

Figure 1:
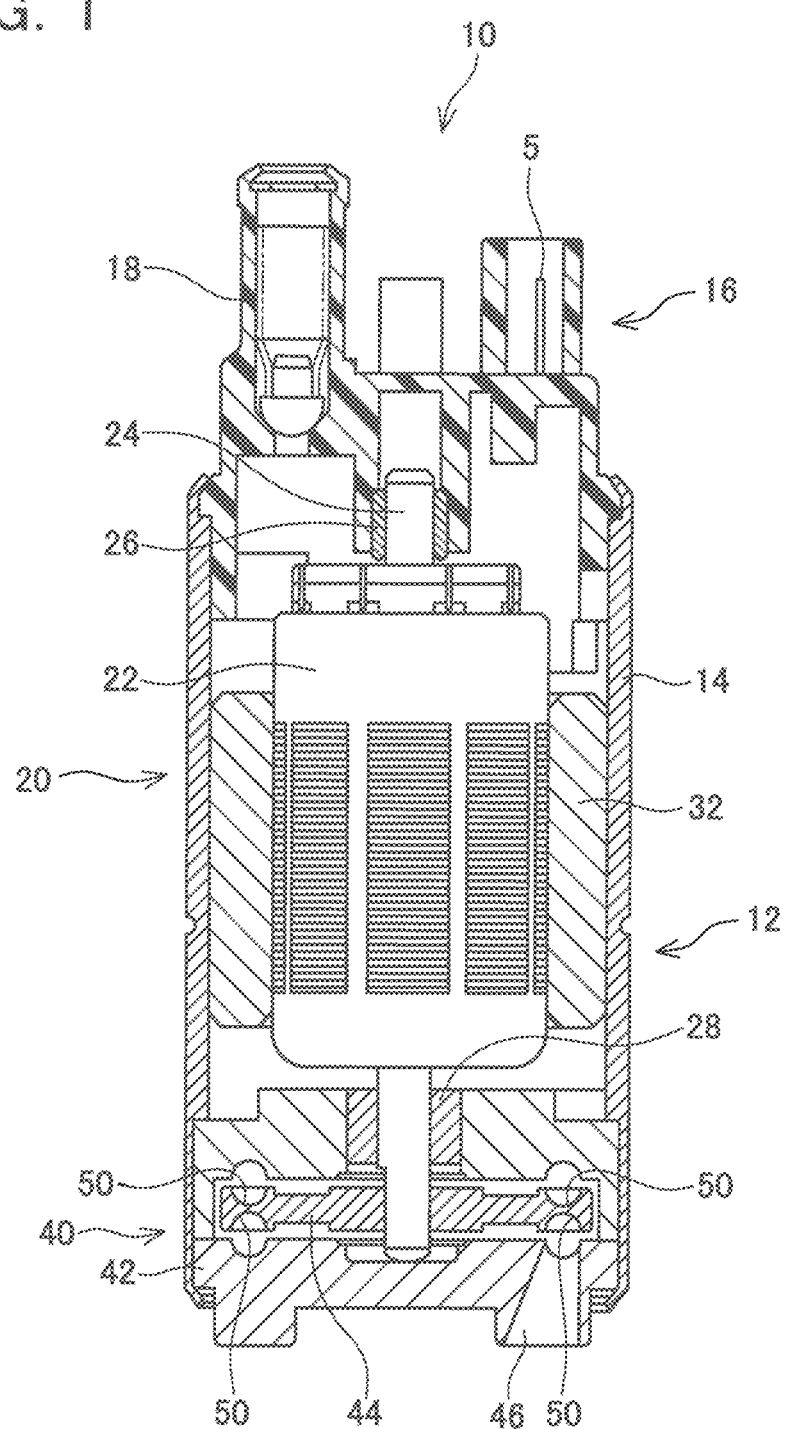
FIG. 1 shows a longitudinal cross-sectional view of a fuel pump.

Main features of the embodiments described below will now be listed. It is to be understood that the following technical elements respectively constitute independent technical elements which exhibit technical usefulness either solely or in various combinations thereof, and shall not be limited to the combinations described in the claims at the time of filing.

In the rotor, the insert portion may be located at a rotating center of the rotator and have an asymmetrical shape relative to the rotating center. A number of the one or more communicating openings in an area corresponding to a portion with a distance from an inner circumference surface of the insert portion being close may be more than a number of the one or more communicating openings in an area corresponding to a portion with a distance from the inner circumference surface of the insert portion being far. According to this configuration, the rotating shaft may be easily engaged with the insert portion, as compared with a configuration that a distance from an inner circumference surface of the insert portion in a rotating shaft direction to a rotation center is constant. Further, based on the disposition of the communicating openings, weight balance of the rotator may be improved. Consequently, the rotator may be smoothly rotated.

In the manufacturing method of the rotator, filling of the molten resin may include simultaneously flowing the molten resin in the rotator forming space along the axis direction of the insert portion forming member and the communicating opening forming member. According to this configuration, occurrence of a weld line may be properly suppressed.

In the manufacturing method of the rotator, the mold may further may comprise a fill-in space disposed between the gate and the rotator forming space and configurd to be filled by the molten resin. The fill-in space may cover the insert portion forming member and the communicating opening forming member. The filling of the molten resin may include flowing the molten resin from the gate to the rotator forming space through the fill-in space. According to this configuration, the molten resin may flow from the gate into the fill-in-space. The molten resin that flows into the fill-in-space may flow into a rotator forming space, from above one end of the insert portion forming member and the communicating opening forming member, along the insert portion forming member and the communicating opening forming member. As a result, occurrence of a weld line may be properly suppressed.

In the manufacturing method of the rotator, the mold may further comprise a communicating portion communicating the fill-in space and the rotator forming space. The communicating member may be defined by an inner surface of the mold, an outer circumference surface of the insert portion forming member and an outer circumference surface of the communicating opening forming member. The inner surface of the mold defining the communicating portion may be disposed along the outer circumference surface of the insert portion forming member and the outer circumference surface of the communicating opening forming member. The filling of the molten resin may include flowing the molten resin from the fill-in space to the rotator forming space through the communicating portion. According to this configuration, the area of the communicating portion may be made small. As a result, in the forming, force applied to the resin in the rotator forming space may be made small, without lowering the pressure applied to the resin. Consequently, occurrence of deformation or crack of the impeller due to residual stress remaining in the rotator after the resin molding may be suppressed.

In the manufacturing method of the rotator, the fill-in space and the communicating opening forming member may be disposed coaxially. According to this configuration, the molten resin may be simultaneously passed to the surrounding of the insert portion forming member.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved rotators, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

(First Embodiment)
(Configuration of a Fuel Pump 10)

As shown in FIG. 1, a fuel pump 10 is disposed in a fuel tank (not shown), and is configured to supply a fuel (e.g., gasoline, a mixed fuel of ethanol and gasoline, or the like, for example) to an engine (not shown) of an automobile. As shown in FIG. 1, the fuel pump 10 includes a motor portion 20 and a pump portion 40.

The motor portion 20 and the pump portion 40 are disposed in a case 12. The case 12 includes a cylindrical housing 14, a casing 42 (i.e., a part of the pump portion 40) for blocking a lower end opening of the housing 14, and a lid portion 16 for blocking an upper end opening of the housing 14.

The motor portion 20 is a brushed motor not shown. The motor portion 20 includes an armature 22 and a permanent magnet 32. The permanent magnet 32 is disposed along an inner circumference surface of the housing 14. At an inner circumference side of the permanent magnet 32, the armature 22 is disposed. At a center of the armature 22, a shaft 24 is pierced and fixed. A lower end of the shaft 24 is inserted into and pierces a center portion of an impeller 44 of the pump portion 40.

The shaft 24 is rotatably held by the casing 42, via a lower bearing 28 at an upper end side of the pump portion 40 (i.e., a lower end side of the motor portion 20). An upper end of the shaft 24 is rotatably held by the lid portion 16, via an upper bearing 26. That is, the armature 22 is rotatably held by the case 12.

The lid portion 16 is disposed above the motor portion 20. The lid portion 16 is made of resin. The lid portion 16 is provided with a discharge port 18, an external terminal 5, and the upper bearing 26. The discharge port 18 communicates between an outer side and an inner side of the case 12. The upper bearing 26 is fitted in a concave portion provided in the vicinity of the center of the lid portion 16. More specifically, the upper bearing 26 is pressurized upward from below, into the concave portion having a downward opening of the lid portion 16. The external terminal 5 pierces the lid portion 16 from above the lid portion 16 (i.e., from above the case 12), and reaches the motor portion 20 of the case 12. The external terminal 5 is fixed to the lid portion 16 by insert molding. The external terminal 5 is connected to a battery (not shown) of the automobile.

The pump portion 40 includes the casing 42 and the impeller 44. The casing 42 is made of metal. A suction port 46 is provided at a lower end of the casing 42. A communicating opening (not shown) that communicates between the inside of the casing 42 and the motor portion 20 is provided at an upper end of the casing 42. The impeller 44 is accommodated in the casing 42. The lower bearing 28 is fixed to the casing 42 positioned above the impeller 44.

Figure 2:
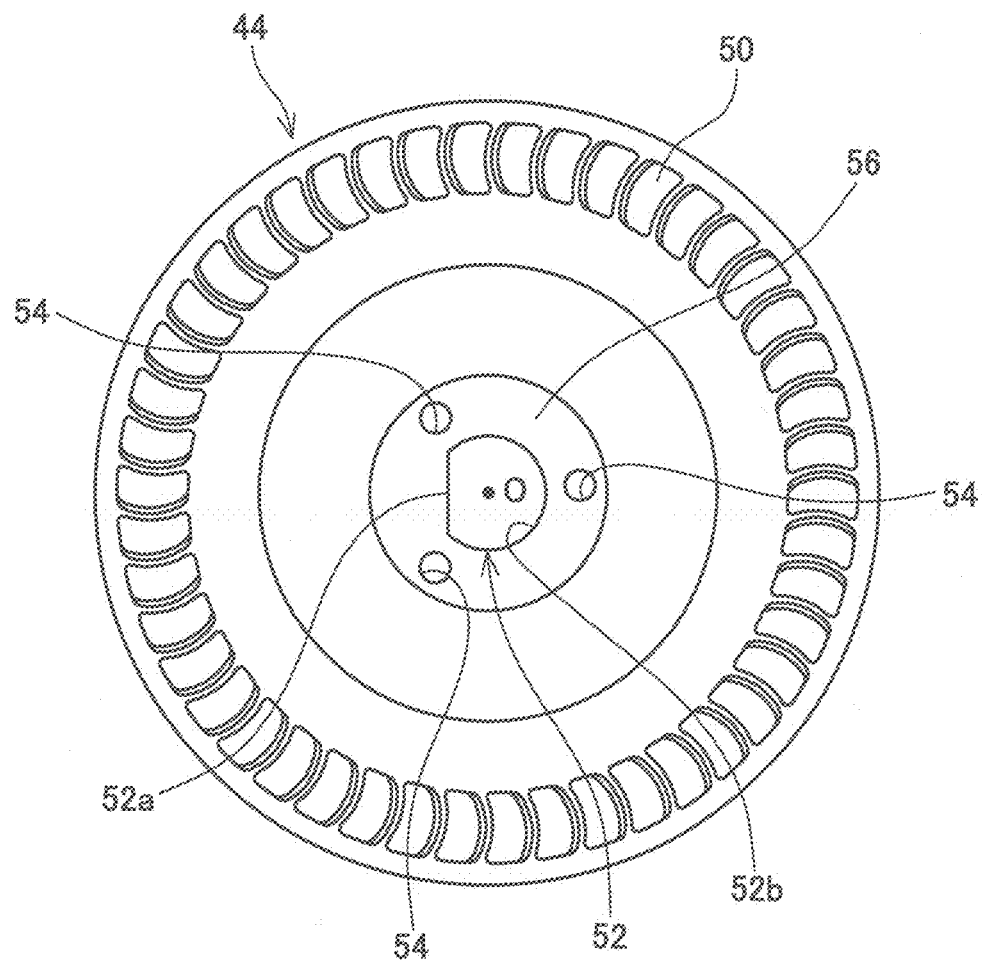
FIG. 2 shows a plain view of an impeller of a first embodiment.

The impeller 44 is made of resin containing a glass fiber and an inorganic substance. As shown in FIG. 2, when the impeller 44 is looked at in the rotating shaft direction, the impeller 44 has a disk shape. The impeller 44 includes a plurality of blade grooves 50, an insert opening 52, a plurality of communicating openings 54, and a convex surface portion 56. The convex surface portion 56 is protruded from both surfaces of the impeller 44. The convex surface portion 56 has a circular ring shape centered at a rotation center O.

The insert opening 52 is disposed centered at the rotation center O of the impeller 44. The insert opening 52 pierces the impeller 44 in an axis direction. The rotation center O of the impeller 44 coincides with the center of the disk-shaped impeller 44. An inner circumference surface of the insert opening 52 is configured by a partially cylindrical portion 52b with the rotation center O as a center, and a plane surface portion 52a forming connection between both ends of the partially cylindrical portion 52b. The insert opening 52 is formed asymmetrically relative to the rotation center O. That is, a distance from the inner circumference surface of the insert opening 52 to the rotation center O changes in a rotation direction of the impeller 44. The plane surface portion 52a is nearer the rotation center O as compared with the partially cylindrical portion 52b. The lower end of the shaft 24 is inserted in the insert opening 52. The shaft 24 is fitted in the insert opening 52.

The communicating openings 54 are disposed around the insert opening 52. Each communicating opening 54 pierces the convex surface portion 56. The communicating openings 54 are disposed at equal intervals in a circumference direction of the impeller 44. The communicating openings 54 pierce the impeller 44 in the axis direction. The communicating openings 54 are disposed to adjust a pressure of a fuel on front and rear surfaces of the impeller 44.

The blade grooves 50 are formed at inside positions with a predetermined distance from an outer circumference of the impeller 44. The blade grooves 50 are arranged at equal intervals in a circumference direction of the impeller 44, on both surfaces of the impeller 44. Each of the blade grooves 50 formed on one surface are communicated to each of the blade grooves 50 formed on the other surface.

(Operation of the Fuel Pump 10)

When current is supplied from the battery to the fuel pump 10, the current is supplied from the external terminal 5 to the armature 22 via the brush. As a result, the armature 22 rotates centered around the shaft 24. The rotation of the armature 22 is transmitted to the impeller 44 via the shaft 24, and the impeller 44 rotates. The shaft 24 is fitted in the impeller 44. The plane surface portion 52a prevents the shaft 24 from rotating in the insert opening 52. According to this configuration, as compared with the configuration that the inner circumference surface of the insert opening 52 is in the cylindrical shape, rotation of the shaft 24 in the insert opening 52 can be easily prevented. When the impeller 44 starts rotation, the fuel in the fuel tank is sucked from the suction port 46 into the casing 42. A pressure applied to the fuel in the casing 42 is increased by the rotation of the impeller 44, and the fuel flows into the motor portion 20 by passing through the communicating openings. The fuel flowing into the motor portion 20 passes between the armature 22 and the permanent magnet 32, and is discharged outside of the fuel pump 10 from the discharge port 18. The fuel discharged outside of the fuel pump 10 is supplied to the engine via a fuel path (not shown).

(Manufacturing Method of the Impeller 44)

Figure 3:
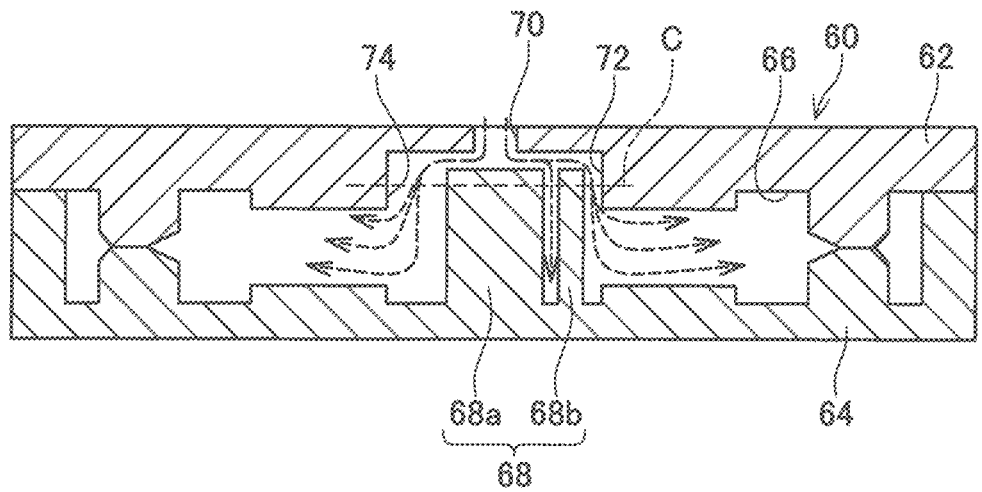
FIG. 3 shows a longitudinal cross-sectional view of a mold for explaining a manufacturing method of the impeller.

As shown in FIG. 3, the impeller 44 is manufactured by injection molding of resin using a mold 60. The mold 60 includes an upper mold 62 and a lower mold 64. By superposing the upper mold 62 and the lower mold 64, a cavity 66 (an example of a "rotator forming space") as a space for molding the impeller 44 is defined. The cavity 66 has a space of a shape that is the same as an external shape of the impeller 44.

The upper mold 62 includes a gate 70. The gate 70 pierces the upper mold 62. The gate 70 communicates between an outer side of the mold 60 and the cavity 66. The gate 70 is disposed at a position corresponding to the rotation center O of the impeller 44. The position corresponding to the rotation center O of the impeller 44 means a position of the rotation center O at the time when the impeller 44 is molded in the cavity 66. The upper mold 62 defines a fill-in space 72 between the gate 70 and the cavity 66. The fill-in space 72 is a cylindrical space. A center axis of the fill-in space 72 is positioned coaxially with a center of the gate 70, and is also positioned coaxially with a position corresponding to the rotation center O of the impeller 44.

The fill-in space 72 is communicated to the cavity 66 via a communicating portion 74. The communicating portion 74 is defined by an inner circumference surface of the mold 60 that defines the fill-in space 72 and the cavity 66, and by outer circumference surface of a plurality of pins 68 described later.

The lower mold 64 includes the pins 68. The pins 68 include a pin 68a (an example of an "insert portion forming member") for forming the insert opening 52, and pins 68b (an example of a "communicating opening forming member") for forming the communicating openings 54. The pin 68a is disposed at a position corresponding to the rotation center O of the impeller 44. The pin 68a is disposed coaxially with the gate 70 and the fill-in space 72. The axis of the pin 68a passes through the position corresponding to the rotation center O of the impeller 44, along the axis direction of the impeller 44. The pins 68b are disposed at positions respectively corresponding to the communicating openings 54. Upper ends of the pins 68 are positioned in the fill-in space 72. The fill-in space 72 covers the pins 68.

The manufacturing method of the impeller 44 includes filling, forming, and cutting. In the filling, first, molten resin is injected from the gate 70 into the mold 60. As shown by arrows in FIG. 3, the molten resin flows into the fill-in space 72 after passing through the gate 70. The molten resin flowing into the fill-in space 72 is spread in the fill-in space 72, along the upper surface of the pin 68a. Then, the molten resin flows along outer circumference surfaces of the pins 68, flows in a vertical direction, that is, along axis directions of the pins 68, and flows into the cavity 66.

The pin 68a is disposed coaxially with the gate 70. Therefore, the molten resin passing through the gate 70 collides against the upper surface of the pin 68a, and is spread in the fill-in space 72. Because the fill-in space 72 covers the pins 68, the molten resin that is spread in the fill-in space 72 covers the pins 68. As a result, the molten resin simultaneously flows in the vertical direction, along the outer circumference surfaces of the pins 68. The "simultaneously" is a concept that includes an error of a short period from when the molten resin starts flowing into the fill-in space 72 till when the molten resin is spread in the fill-in space 72, in addition to strictly simultaneously. The molten resin flowing into the cavity 66 flows toward a position corresponding to the outer circumference of the impeller 44, and is filled in the cavity 66. As shown by the arrow in FIG. 3, the molten resin flows in the vertical direction, along the outer circumference surfaces of the pins 68, and also flows in directions separated from the outer circumference surfaces of the pins 68. Particularly, as the molten resin flows downward along the outer circumference surfaces of the pins 68, the molten resin also flows in directions separated from the outer circumference surfaces of the pins 68.

When the molten resin is filled in the cavity 66, the filling ends, and the forming is started. In the forming, by applying force to the molten resin from the gate 70, predetermined pressure is applied to the molten resin in the cavity 66. When the molten resin is solidified in the state that the force is applied to the molten resin, the force applied to the molten resin is released, and an intermediate product of the impeller 44 is taken out of the mold 60.

When the intermediate product of the impeller 44 is taken out of the mold 60, the forming ends, and the cutting is started. In the cutting, the intermediate product of the impeller 44 is cut along a cutting surface C that passes through the communicating portion 74, and the resin filled in the fill-in space 72 is cut. As a result, manufacturing of the impeller 44 is completed. On the convex surface portion 56 of the impeller 44, the resin filled in the fill-in space 72 remains. A shape of the convex surface portion 56 is equal to the shape of the communicating portion 74.

(Effects of the Present Embodiment)

In the filling, at the circumferences of the pins 68, the molten resin flows along the outer circumference surfaces of the pins 68. Therefore, branching of the molten resin due to collision against the pins 68 can be suppressed. As a result, occurrence of a weld line formed due to joining of the branched molten resin can be suppressed. Further, by simultaneously passing the molten resin along the outer circumference surfaces of the pins 68, occurrence of a weld line due to joining of the molten resin can be properly prevented.

If a weld line occurs, size precision of the impeller 44 decreases because a contraction percentage of the rein at the circumference of the weld line after the molding is different, due to the difference of orientation of the glass fiber and the like contained in the resin at the circumference of the weld line. Further, due to the weld line, strength of the impeller 44 sometimes becomes lower. In the present embodiment, by suppressing the occurrence of the weld line, reduction in the size precision and reduction in the strength of the impeller 44 can be suppressed.

When a resin flow direction in the impeller 44 is observed, a flow direction of the resin positioned around the insert opening 52 is extended from one surface of the impeller 44 to the rotating shaft direction. More specifically, in the resin molding, the resin flow direction is extended to the rotating shaft direction in the vicinity of the surface of the impeller 44 at the side nearer the gate 70. As a separation distance from the surface of the impeller 44 at a near side the gate 70 becomes larger, the resin flow direction is also extended to the outer circumference of the impeller 44 as well as being extended to the rotating shaft direction. Similarly, around the communicating openings 54, flow directions of the resin positioned around the insert opening 52 are extended from one surface of the impeller 44 to the rotating shaft direction. For example, by observing directions of the glass fiber contained in the resin, by a magnification of about fifty times, by using a stereomicroscope, in a cross section parallel to the rotating shaft of the impeller 44 passing through the center of any one of the openings of the insert opening 52 and the communicating openings 54, resin flow directions can be clearly specified.

(Modification of the First Embodiment)

Figure 4:
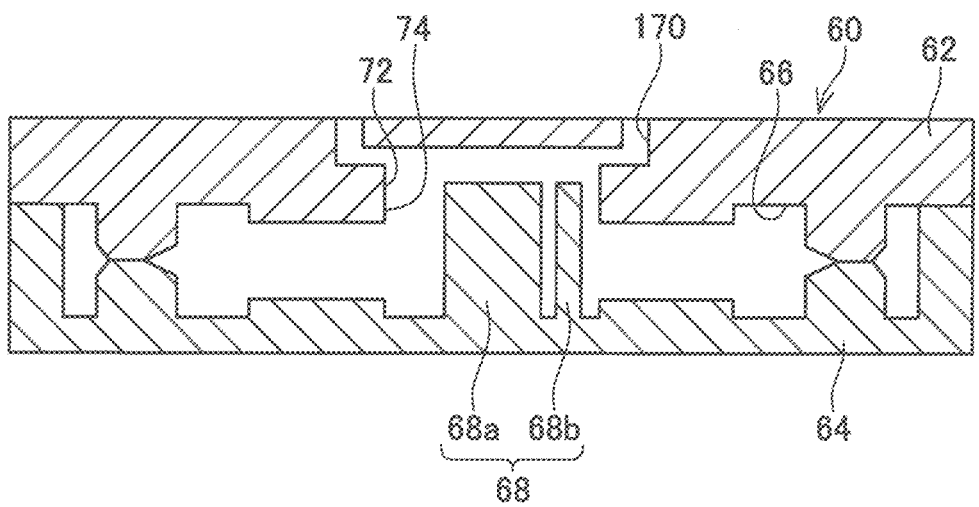
FIG. 4 shows a longitudinal cross-sectional view of a mold modification.

As shown in FIG. 4, the mold 60 may be configured to include a gate 170 in place of the gate 70. The gate 170 has a circular ring shape. A diameter of the gate 170 may be larger than a diameter of the fill-in space 72.

(Second Embodiment)

Figure 5:
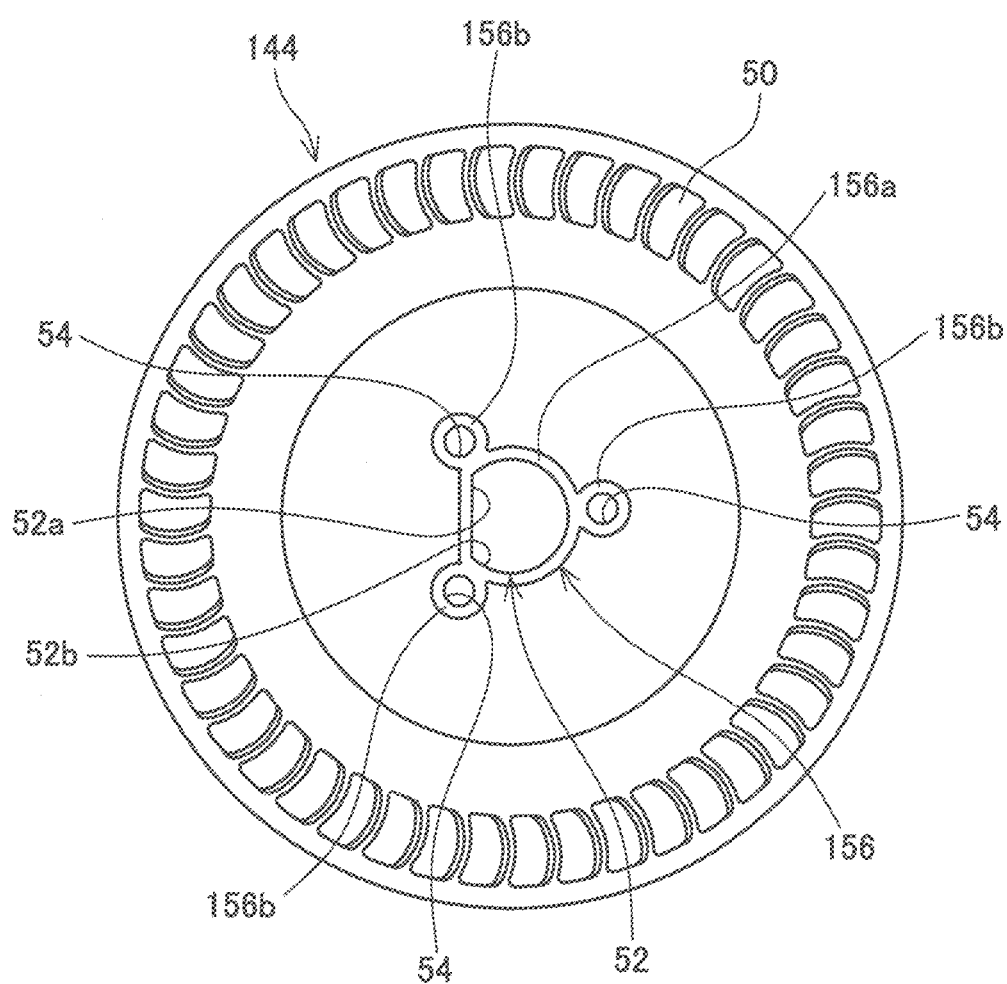
FIG. 5 shows a plain view of an impeller of a second embodiment.

Points different from the first embodiment will be described. As shown in FIG. 5, in an impeller 144, a shape of a convex surface portion 156 is different from the shape of the convex surface portion 56 of the impeller 44. The convex surface portion 156 includes a portion 156a along an outer circumference shape of the insert opening 52, and a plurality of portions 156b along outer circumference shapes of the communicating openings 54. Each portion 156b is in contact with the portion 156a. A width of each of the portions 156a and 156b is smaller than a distance between the insert opening 52 and each communicating opening 54. Specifically, a width of each of the portions 156a and 156b is about a half of the distance between the insert opening 52 and each communicating opening 54. A width of the convex surface portion 156 is smaller than a width of the convex surface portion 56.

A shape of the convex surface portion 156 is equal to a shape of the communicating portion 74 of the mold 60. That is, in the present embodiment, an area of the communicating portion 74 that communicates between the fill-in space 72 and the cavity 66, that is, the area of the cut surface, is relatively small.

In the present embodiment, effects similar to those in the first embodiment are also obtained. Further, by decreasing the area of the communicating portion 74, residual stress of the resin after the resin molding can be decreased. This is for the following reason. In the forming, the molten resin is solidified by applying predetermined pressure to the molten resin. As a result, the molten resin is gradually solidified inside from a position where the molten resin is in contact with a forming surface of the cavity 66 of the mold 60. As a result, in the cavity 66 in the latter half of the forming, the resin at other than a part of a lower portion of the communicating portion 74 is solidified, and the molten resin becomes in the state of remaining at only the circumference of the communicating portion 74. In this state, in order to apply predetermined pressure to the molten resin in the cavity 66, force corresponding to the area of the communicating portion 74 needs to be applied to the molten resin. When the area of the communicating portion 74 is small, the force to be applied to the molten resin may be small. As a result, the residual stress of the resin after the resin forming can be decreased.

(Modification of the Second Embodiment)

Figure 6:
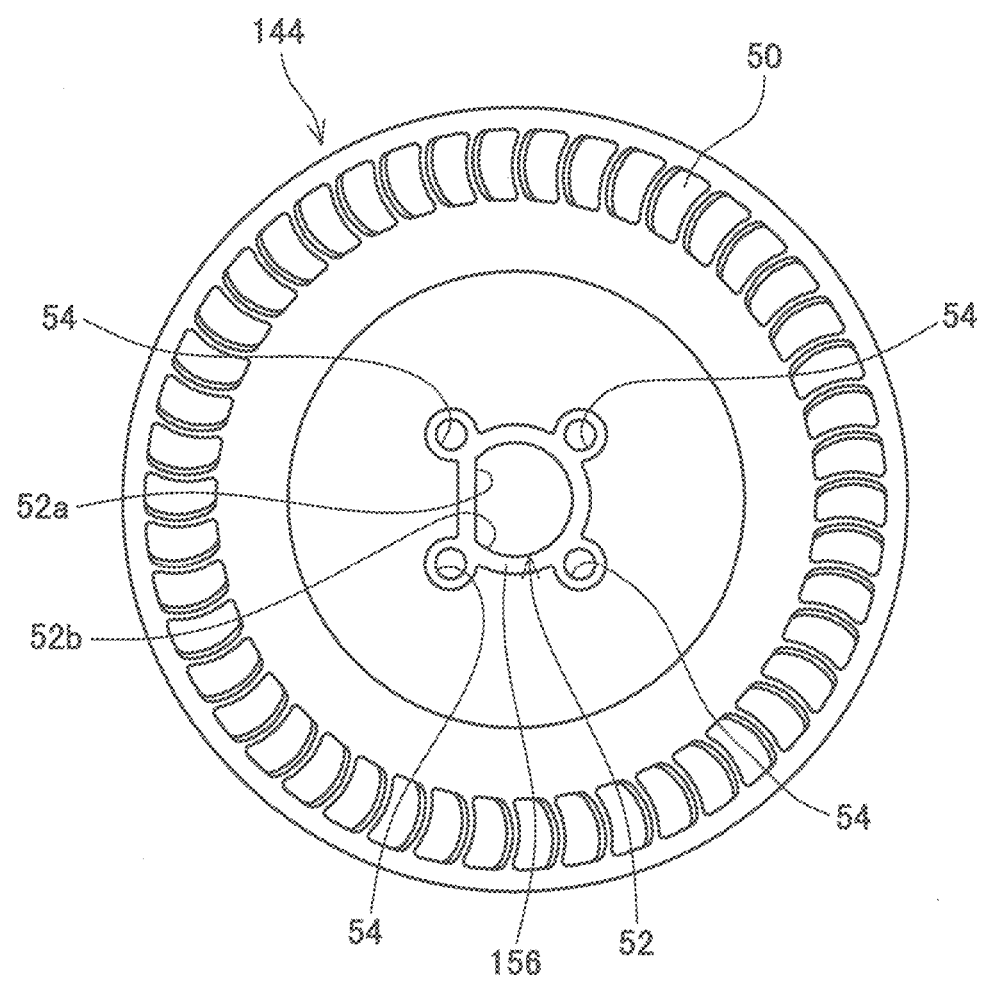
FIG. 6 shows a plain view of an impeller of a modification of the second embodiment.

In the above embodiment, the impeller 144 includes three communicating openings 54. However, there is no limit to the number of communicating openings 54. For example, as shown in FIG. 6, the impeller 144 may be configured to include four communicating openings 54. This is similarly applied to the impeller 44 in the first embodiment.

Figure 7:
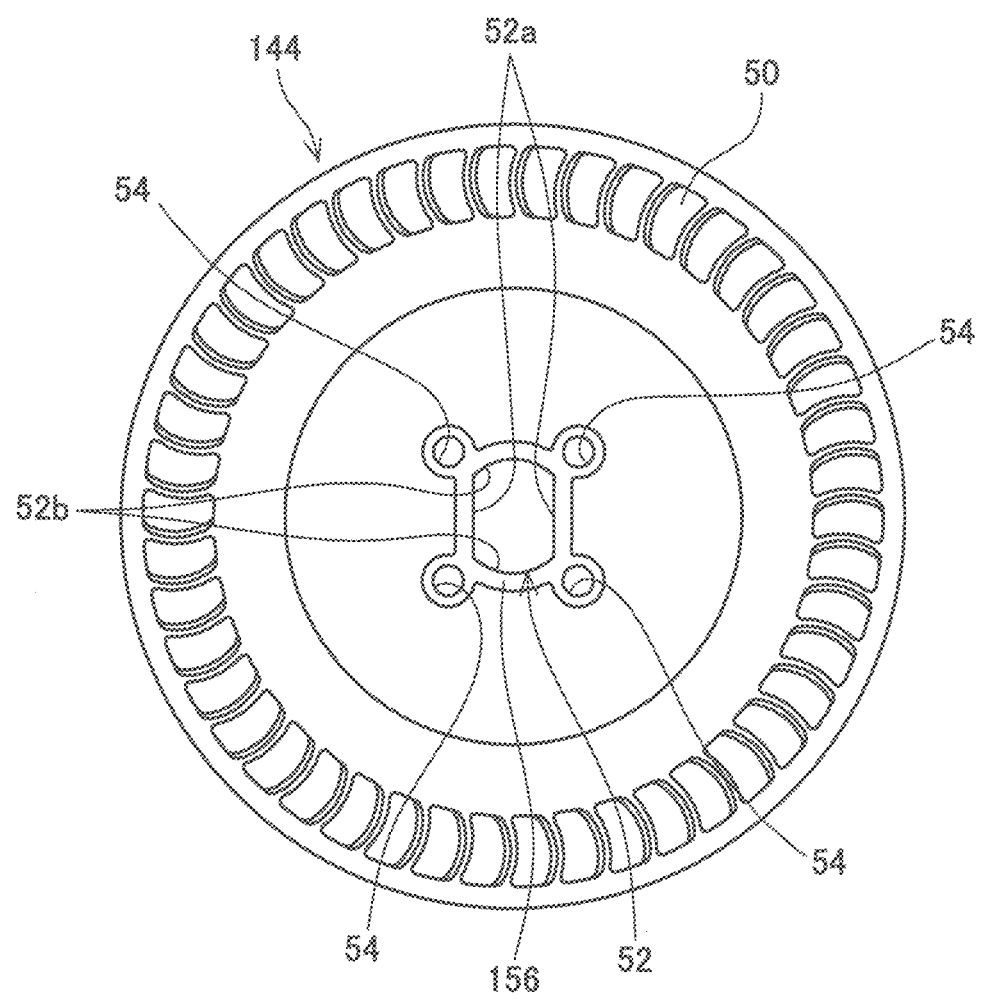
FIG. 7 shows a plain view of an impeller of a modification of the second embodiment
Figure 8:
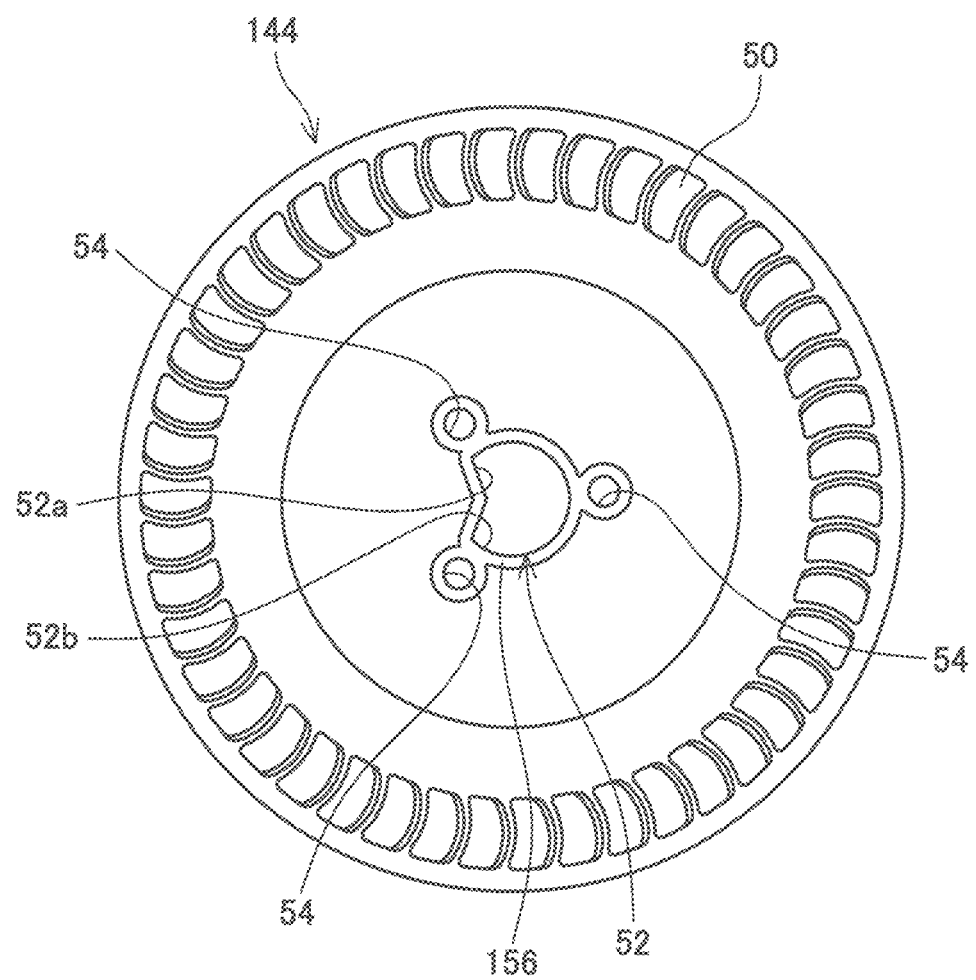
FIG. 8 shows a plain view of an impeller of a modification of the second embodiment.
Figure 9:
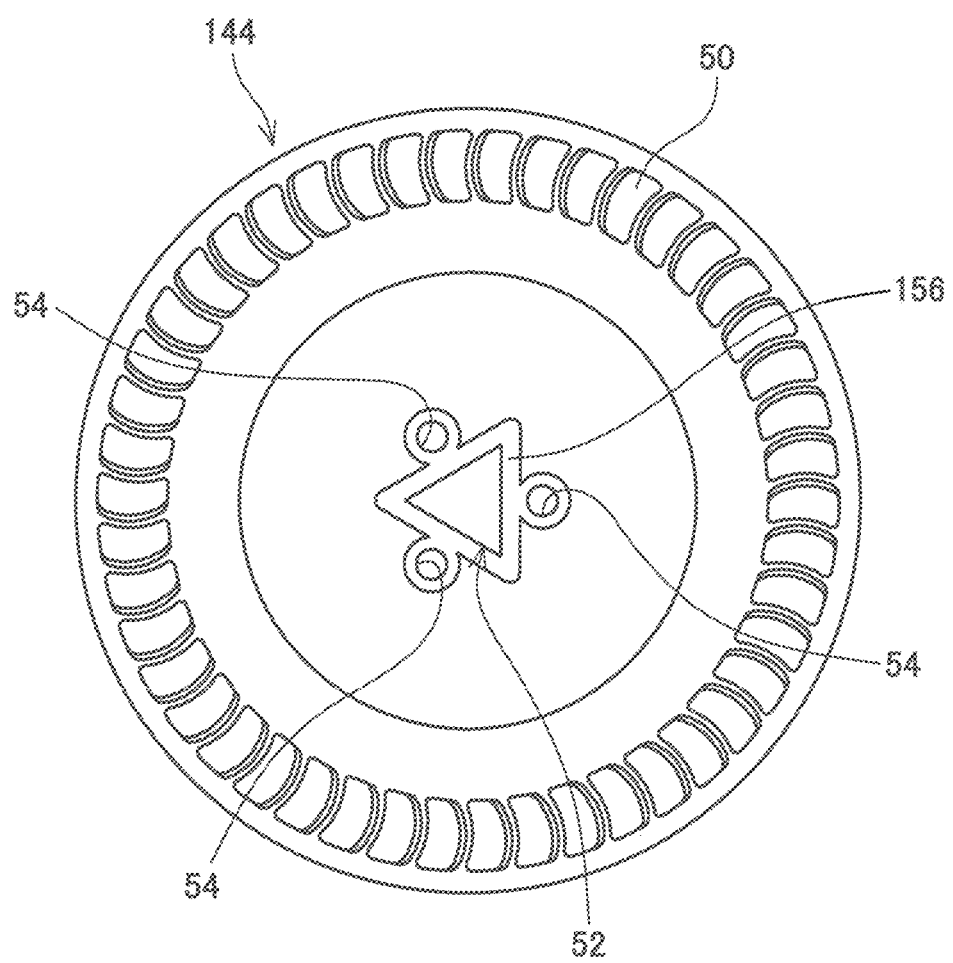
FIG. 9 shows a plain view of an impeller of a modification of the second embodiment.

A shape of the insert opening 52 may be any one of shapes shown in FIGS. 7 to 9. As shown in FIG. 7, the insert opening 52 may be configured to include a pair of mutually opposite plane surface portions 52a, and a pair of mutually opposite cylindrical portions 52b. In this case, the impeller 144 may be configured to include four communicating openings 54. Alternatively, as shown in FIG. 8, the plane surface portion 52a of the insert opening 52 may be configured to be bent. Further, as shown in FIG. 9, the insert opening 52 may be in a triangular cylindrical shape. In this case, the communicating opening 54 may be configured to be positioned outside of the three plane surfaces of the insert opening 52.

(Third Embodiment)

Figure 10:
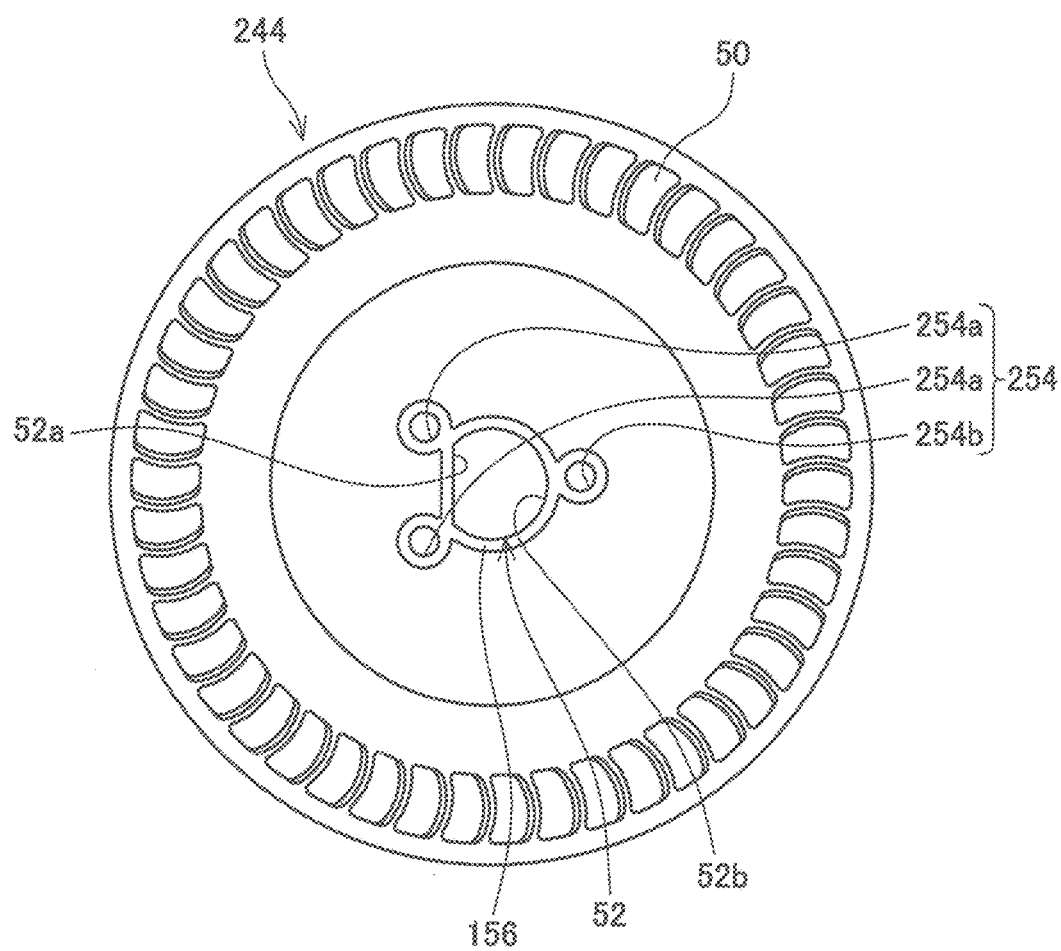
FIG. 10 shows a plain view of an impeller of a third embodiment.

Points different from the second embodiment will be described. As shown in FIG. 10, in an impeller 244, positions of communicating openings 254 are different from positions of the communicating openings 54 of the impeller 144. Shapes of the communicating openings 254 are similar to those of the communicating openings 54.

Out of three communicating openings 254, one communicating hole 254b is disposed outside of a center portion of the partially cylindrical portion 52b. Out of the three communicating openings 254, two communicating openings 254a other than the communicating hole 254b are disposed outside of end portions of the plane surface portion 52a. That is, a number of the communicating openings 254a formed outside of the plane surface portion 52a as an area in which a distance from an inner circumference surface of the insert opening 52 to the rotation center is near is larger than a number of the communicating hole 254b formed outside of the partially cylindrical portion 52b as a region in which a distance from the inner circumference surface of the insert opening 52 to the rotation center is far. According to this configuration, based on the disposition of the communicating openings 254, weight balance of the impeller 244 can be improved. As a result, the impeller 244 can be rotated smoothly.

(Modification of the Third Embodiment)

Figure 11:
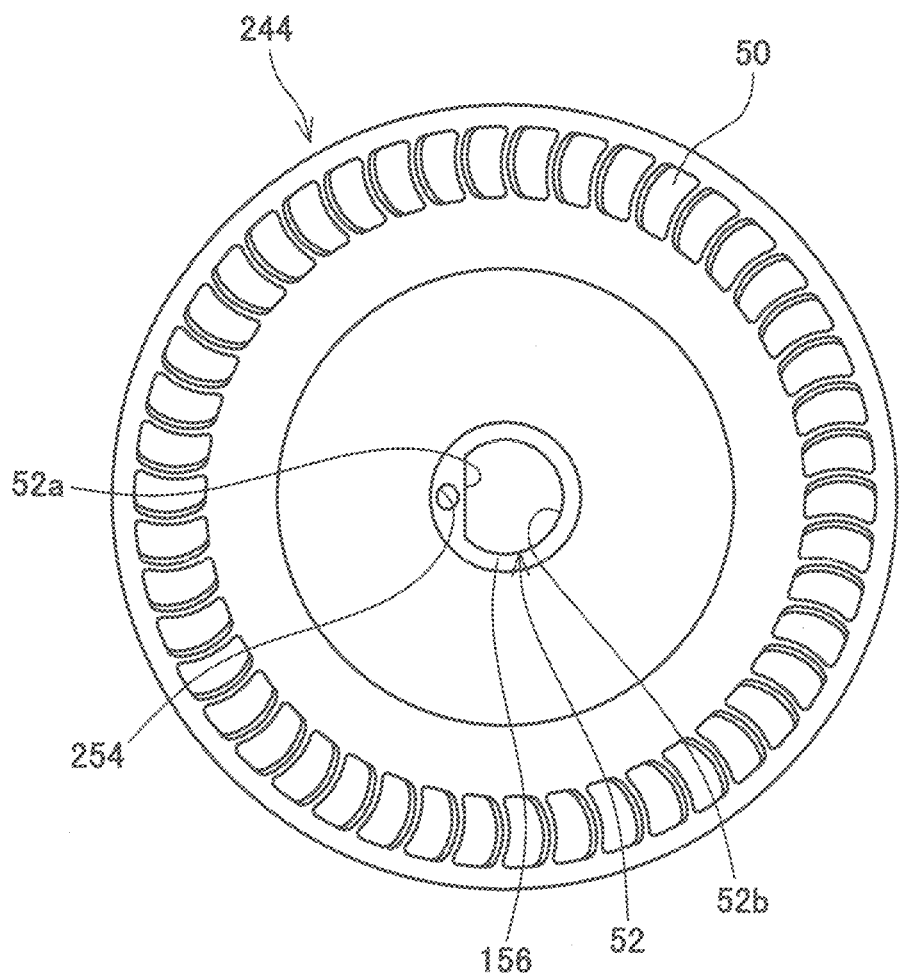
FIG. 11 shows a plain view of an impeller of a modification of the third embodiment.

In the above embodiment, the impeller 244 includes the three communicating openings 254. However, as shown in FIG. 11, the impeller 244 may be configured to include one communicating opening 254. In this case, the one communicating opening 254 may be disposed outside of the center portion of the plane surface portion 52a. In the present modification, a number of the communicating opening 254 (i.e., one) in the plane surface portion 52a as an area in which a distance from an inner circumference surface of the insert opening 52 to the rotation center is near is larger than a number (i.e., zero) of the communicating opening 254 in the partially cylindrical portion 52b as a region in which a distance from the inner circumference surface of the insert opening 52 to the rotation center is far.

(Fourth Embodiment)

Figure 12:
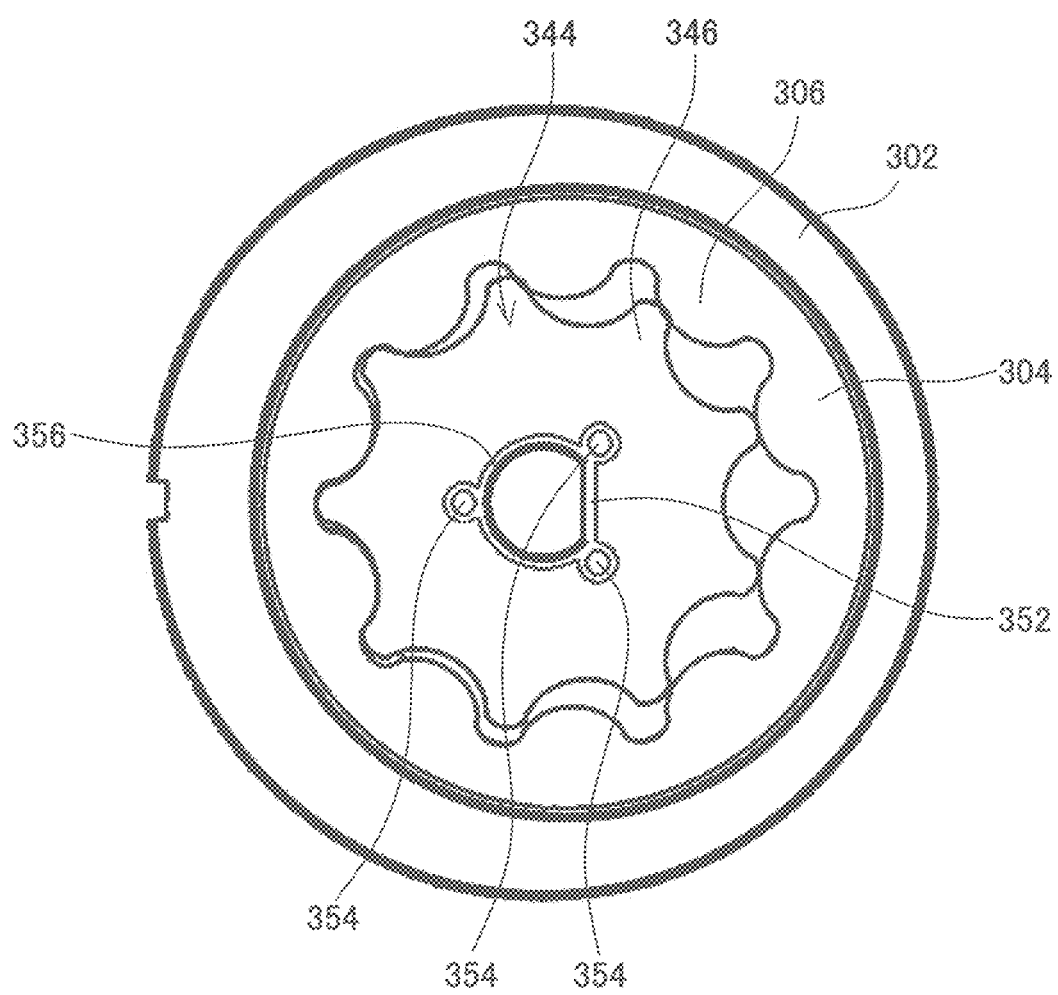
FIG. 12 shows a configuration of a periphery of an inner rotor of a forth embodiment.

As shown in FIG. 12, an inner rotor 344 (an example of a "rotator") in the present embodiment is used for what is called an internal gear pump. The gear pump in the present embodiment is used to circulate engine oil of an automobile, for example. As shown in FIG. 12, the inner rotor 344 is accommodated in a casing 302 of a gear pump. The casing 302 is configured to accommodate an outer rotor 304 in addition to the inner rotor 344.

The outer rotor 304 has a circular ring shape. An outer circumference surface of the outer rotor 304 has a shape along an inner circumference surface of the casing 302. On an inner circumference surface of the outer rotor 304, a plurality of inner teeth 306 is disposed at equal intervals. The inner rotor 344 has a disk shape having a plurality of outer teeth 346 on the outer circumference surface. The outer teeth 346 have shapes that mesh with the inner teeth 306. The outer teeth 346 are disposed at equal intervals on an outer circumference surface of the inner rotor 344.

At a center of the inner rotor 344, there are disposed an insert opening 352, a plurality of communicating openings 354, and a convex surface portion 356. Configurations of the insert opening 352, the communicating openings 354, and the convex surface portion 356 are the same as the configurations of the insert opening 52, the communicating openings 54, and the convex surface portion 156, respectively in the second embodiment. The inner rotor 344 turns on its axis following rotation of a shaft inserted in the insert opening 352. The inner rotor 344 further revolves along an inner circumference surface of the outer rotor 304. The outer rotor 304 turns on its axis in a direction opposite to a turn direction on its axis of the inner rotor 344, following rotation of the inner rotor 344. With this arrangement, liquid is suctioned into between the inner rotor 344 and the outer rotor 304, and the liquid is discharged from between the inner rotor 344 and the outer rotor 304.

The inner rotor 344 is manufactured by a method similar to that of manufacturing the impeller 44. Therefore, resin flow directions around the insert opening 352 and the communicating openings 354 are extended along the insert opening 352 and the communicating openings 354.

(Fifth Embodiment)

Figure 13:
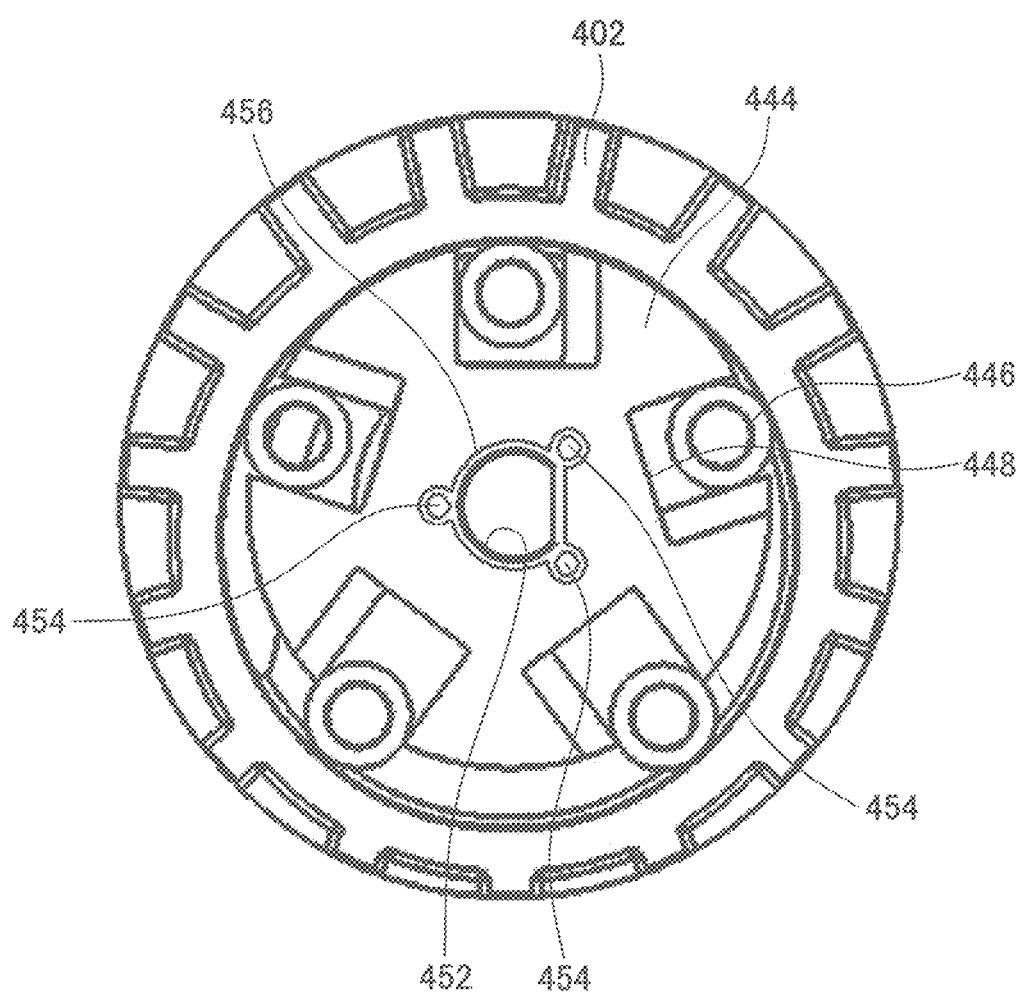
FIG. 13 shows a configuration of a periphery of a rotor of a fifth embodiment.

As shown in FIG. 13, a rotor 444 (an example of a "rotator") in the present embodiment is used for what is called a vane pump. The vane pump in the present embodiment is used to supply oil to a mechanism for power steering of an automobile, for example. As shown in FIG. 13, the rotor 444 is accommodated in a casing 402 of a vane pump.

The rotor 444 has a disk shape. An outer diameter of the rotor 444 is smaller than an inner diameter of the casing 402. A rotation center of the rotor 444 is deviated from a center of an inner circumference surface of the casing 402.

On an outer circumference portion of the rotor 444, a plurality of grooves 448 is disposed at equal intervals. In each of the grooves 448, a circular ring-shaped roller 446 is inserted. The roller 446 is disposed to be able to move in a radial direction of the rotor 444, along the grooves 448.

At a center of the rotor 444, there are provided an insert opening 452, a plurality of communicating openings 454, and a convex surface portion 456. Configurations of the insert opening 452, the communicating openings 454, and the convex surface portion 456 are the same as the configurations of the insert opening 52, the communicating openings 54, and the convex surface portion 156, respectively in the second embodiment. The rotor 444 rotates centered around a shaft center of a shaft, following rotation of the shaft inserted in the insert opening 452. The roller 446 is caused to move outside in a radial direction of the rotor 444, following rotation of the rotor 444. As a result, the roller 446 is brought into contact with an inner circumference surface of the casing 402, and slides along the inner circumference surface of the casing 402. Consequently, liquid (e.g., oil) positioned between an outer circumference surface of the rotor 444 and the inner circumference surface of the casing 402 is pressurized by the rotor 444, and is discharged outside of the vane pump.

The rotor 444 is manufactured by a method similar to that of manufacturing the impeller 44. Therefore, resin flow directions around the insert opening 452 and the communicating openings 454 are extended along the insert opening 452 and the communicating openings 454.

(Modification of the Fifth Embodiment)

Figure 14:
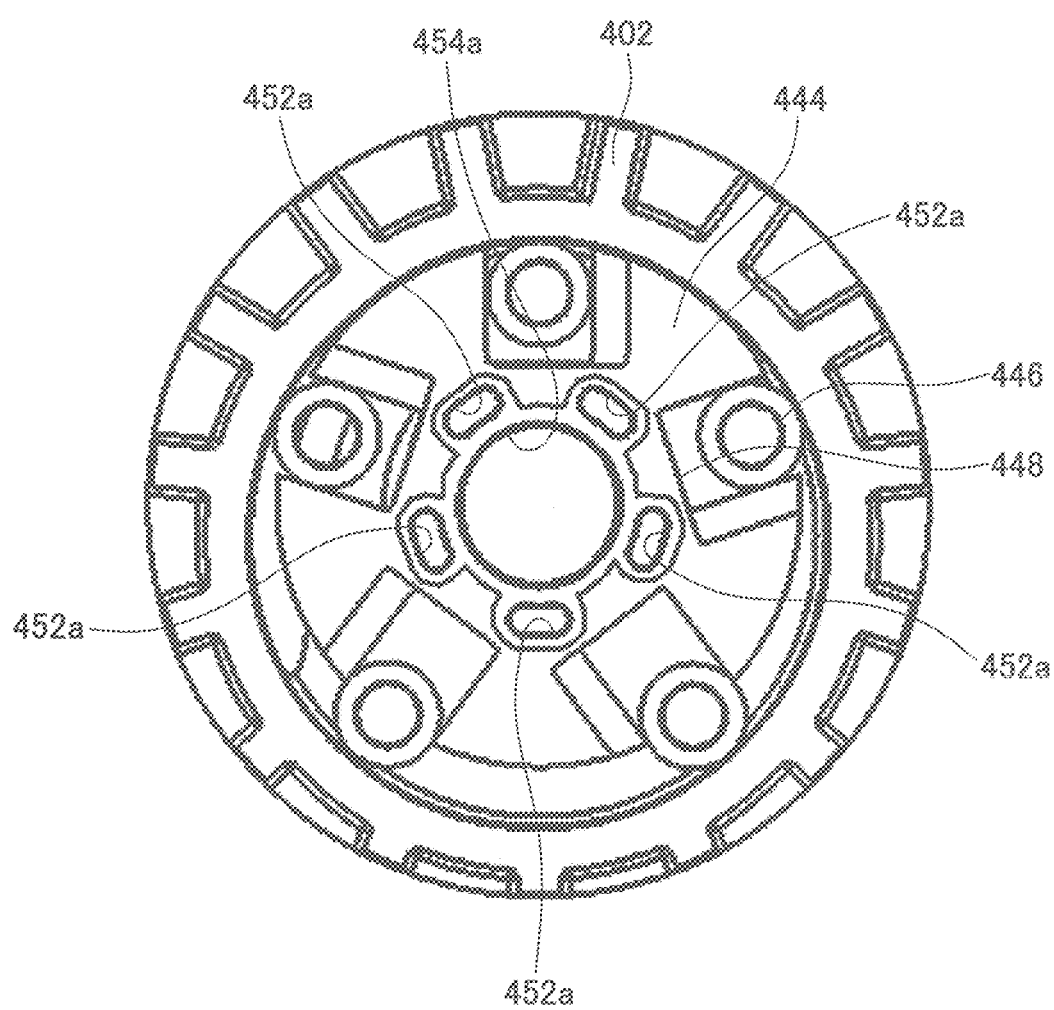
FIG. 14 shows a configuration of a periphery of a rotor of a modification of the fifth embodiment.

In the above embodiment, a shaft is inserted into the insert opening 452 of the rotation center of the rotor 444. However, as shown in FIG. 14, a plurality of insert openings 452a into which shafts are to be inserted may be disposed at equal intervals around a communicating opening 454a formed in the rotation center of the rotor 444. In this case, the shaft may be configured to be inserted in the insert openings 452a. Alternatively, mesh members fitted to the shafts may be configured to be inserted in the insert openings 452a. Also in the latter case, the insert openings 452a are an example of the "insert portion configured to insert a rotation shaft".

(Modifications)

(1) In the first embodiment, the insert opening 52 of the shaft 24 pierces the impeller 44. However, the insert opening 52 may be configured not to pierce the impeller 44. In this case, the pin 68a may be shorter than the pins 68b, and the upper end of the pin 68a may not be accommodated in the fill-in space 72. This is similarly applied to other embodiments.

(2) The "rotator" can be used for various pumps other than a fuel pump and an oil pump used in an automobile, such as a pump for supplying cooling water to a cooling device, for example. A pump having the "rotator" may be a pump equipped with a brushless motor.

The invention claimed is:

1. A rotator configured to be accommodated in a casing of a pump for sucking a fluid into the casing and discharging the fluid outside of the casing, the rotator comprising:
    an insert portion configured to insert a rotating shaft; and
    one or more communicating openings disposed in a vicinity of the insert portion, and piercing the rotator in a direction along the rotating shaft, wherein
    the rotator is made of resin, and
    a direction of fiber contained in the resin located around the insert portion and the one or more communicating openings extends at least in the direction along the rotating shaft,
    the fiber, which extends at least in the direction along the rotating shaft, contained in the resin located around the one or more communicating openings comprises a plurality of fibers,
    a part of the plurality of fibers is located closer to a rotating center of the rotator than each of the one or more communicating openings, and
    another part of the plurality of fibers is located farther from the rotating center of the rotator than each of the one or more communicating openings.

2. The rotator as in claim 1, wherein
    the insert portion is located at the rotating center of the rotator and has an asymmetrical shape relative to the rotating center, and
    a number of the one or more communicating openings in an area corresponding to a portion with a first distance from an inner circumference surface of the insert portion is more than a number of the one or more communicating openings in an area corresponding to a portion with a second distance longer than the first distance from the inner circumference surface of the insert portion.

3. The rotator of claim 1 wherein the rotator is made of a molded resin.

4. The rotator of claim 1 wherein the rotator is made of a fiber impregnated molded resin.

5. The rotator of claim 1 wherein the fiber contained in the resin comprises a glass fiber.

6. A manufacturing method of a rotator configured to be accommodated in a casing of a pump for sucking a fluid into the casing and discharging the fluid outside of the casing, the manufacturing method comprising:
    filling molten resin in a rotator forming space of a mold having a gate and the rotator forming space by injecting the molten resin from the gate of the mold; and
    forming the rotator by cooling the resin in the rotator forming space, wherein
    the mold comprises:
        an insert portion forming member in the rotator forming space, the insert portion forming member configured to form an insert portion configured to insert a rotating shaft; and
        a communicating opening forming member configured to form one or more communicating openings disposed in a vicinity of the insert portion and piercing the rotator in a direction along the rotating shaft, and
    the filling of the molten resin includes flowing the molten resin in the rotator forming space along an axis direction of the insert portion forming member and the communicating opening forming member; wherein the molten resin includes a plurality of fibers, the flowing such that a portion of the plurality of fibers extends in a direction of the rotating shaft in the insert portion, a part of the plurality of fibers is located closer to a rotating center of the rotator than each of the one or more communicating openings, and another part of the plurality of fibers is located farther from the rotating center of the rotator than each of the one or more communicating openings.

7. The manufacturing method of a rotator as in claim 6, wherein
    the filling of the molten resin includes simultaneously flowing the molten resin in the rotator forming space along the axis direction of the insert portion forming member and the communicating opening forming member.

8. The manufacturing method of a rotator as in claim 6, wherein
    the mold further comprises a fill-in space disposed between the gate and the rotator forming space and configured to be filled by the molten resin,
    the fill-in space covers the insert portion forming member and the communicating opening forming member, and
    the filling of the molten resin includes flowing the molten resin from the gate to the rotator forming space through the fill-in space.

9. The manufacturing method of a rotator as in claim 8, wherein
    the mold further comprises a communicating portion communicating the fill-in space and the rotator forming space, the communicating member is defined by an inner surface of the mold, an outer circumference surface of the insert portion forming member and an outer circumference surface of the communicating opening forming member, the inner surface of the mold defining the communicating portion is disposed along the outer circumference surface of the insert portion forming member and the outer circumference surface of the communicating opening forming member, and the filling of the molten resin includes flowing the molten resin from the fill-in space to rotator forming space through the communicating portion.

10. The manufacturing method of a rotator as in claim 8, wherein the fill-in space and the communicating opening forming member are disposed coaxially.

* * * * *